United States Patent
Brack et al.

(10) Patent No.: US 7,259,223 B2
(45) Date of Patent: Aug. 21, 2007

(54) PROCESS FOR THE PRODUCTION OF POLYCARBONATE

(75) Inventors: Hans Peter Brack, Bergen op Zoom (NL); James Anthony Cella, Clifton Park, NY (US); Dennis Karlik, Bergen op Zoom (NL); Lina Prada, Murcia (ES)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 10/802,705

(22) Filed: Mar. 17, 2004

(65) Prior Publication Data

US 2004/0220352 A1 Nov. 4, 2004

Related U.S. Application Data

(63) Continuation of application No. 10/027,139, filed on Dec. 29, 2001, now abandoned.

(60) Provisional application No. 60/258,710, filed on Dec. 28, 2000.

(51) Int. Cl.
*C08G 64/00* (2006.01)
(52) U.S. Cl. ...................... 528/196; 528/198
(58) Field of Classification Search ............. 525/397; 528/196, 198
See application file for complete search history.

(56) References Cited

U.S. PATENT DOCUMENTS

| 3,442,854 | A | 5/1969 | Curtius et al. |
|---|---|---|---|
| 5,026,817 | A | 6/1991 | Sakashita et al. |
| 5,097,002 | A | 3/1992 | Sakashita et al. |
| 5,142,018 | A | 8/1992 | Sakashita et al. |
| 5,151,491 | A | 9/1992 | Sakashita et al. |
| 5,283,285 | A | 2/1994 | Akkapeddi et al. |
| 5,340,905 | A | 8/1994 | Kuhling et al. |
| 5,696,222 | A | 12/1997 | Kaneko et al. |
| 6,022,943 | A | 2/2000 | Inoue et al. |
| 6,252,036 | B1 | 6/2001 | Hatono et al. |
| 2002/0128425 | A1* | 9/2002 | Brack et al. ............. 528/198 |
| 2003/0120025 | A1* | 6/2003 | Brack et al. ............. 528/196 |

FOREIGN PATENT DOCUMENTS

| EP | 764 673 A2 | 3/1997 |
|---|---|---|
| EP | 980861 A1 | 2/2000 |
| EP | 985696 A1 | 3/2000 |
| JP | 2153925 | 6/1990 |
| JP | 6157739 | 6/1994 |
| JP | 7090074 | 4/1995 |

* cited by examiner

*Primary Examiner*—Taylor Victor Oh
(74) *Attorney, Agent, or Firm*—Marina Larson & Associates, LLC

(57) ABSTRACT

A process for the production of polycarbonate having increased end-cap levels, the process comprising adding a terminal blocking agent of the formula:

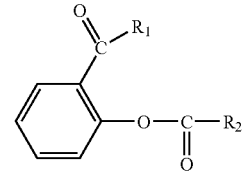

wherein $R_1$ is a propoxy or butoxy and $R_2$ is selected from the group consisting of $C_1$-$C_{30}$ alkyl, $C_1$-$C_{30}$ alkoxy, $C_6$-$C_{30}$ aryl, $C_7$-$C_{30}$ aralkyl, and $C_6$-$C_{30}$ aryloxy.

13 Claims, No Drawings

PROCESS FOR THE PRODUCTION OF POLYCARBONATE

CROSS REFERENCE TO RELATED APPLICATIONS

This application is a continuation of U.S. patent application Ser. No. 10/027,139 filed on Dec. 26, 2001 now abandoned which claims priority from U.S. Provisional Application Ser. No. 60/258,710 filed on Dec. 28, 2000, which are incorporated herein by reference in their entirety.

FIELD OF THE INVENTION

The present invention relates to a process for the production of polycarbonate and the use of carbonate and ester derivatives of propyl and butyl salicylates as terminal blocking agents for polycarbonate.

BACKGROUND OF THE INVENTION

Polycarbonate is a thermoplastic that has excellent mechanical properties (e.g., impact resistance), heat resistance and transparency. Polycarbonate is widely used in many engineering applications. It is known that a high level of end-capping, (i.e., wherein most of the terminal phenolic hydroxyl groups in the polycarbonate are reacted with monofunctional endcapping agents to form relatively inert polymer chain ends) helps to reduce static, improve heat aging, and reduce water absorption. Consequently, various coupling agents and end-cappers have been used to enhance the end-cap levels in the production of polycarbonate.

Unexamined Japanese Patent Application H6-157739 discloses the use of certain non-activated carbonates (e.g., diphenyl carbonate) and esters as end-capping agents.

Japanese Patent Application JP-A 7-90074 discloses a method of producing a polycarbonate from a dihydric compound and a carbonic acid diester by an ester exchange method. In this method, a highly active diester, acid halide or acid anhydride with at least two functional groups is added after the ester exchange ratio exceeds 70% to obtain a polycarbonate having an enhanced degree of polymerization. It should be noted that JP-A 7-90074 teaches the use of de-activated molecules as coupling agents or polymerization promoters, and not end-cappers.

U.S. Pat. No. 5,696,222 and European Application No. EP 0 985 696 A1 disclose a method of producing a polycarbonate having a high-end cap levels by adding certain activated and bis-activated carbonates as end-cappers. It is disclosed that the end-capping agents are added to the process after the polycarbonate formed has an intrinsic viscosity of at least 0.3 dl/g. The resulting polycarbonate has increased end-cap levels with minimal changes in molecular weight or intrinsic viscosity (i.e., it has an intrinsic viscosity that is greater or smaller than the viscosity of the polycarbonate formed before the addition of the end-cappers by at most 0.1 dl/g). It is also disclosed that these end-cappers are activated by a phenolic group having an ortho chlorine atom, methoxycarbonyl or ethoxycarbonyl group. These end-cappers are high melting point solids, and thus require complicated and energy intensive apparatus comprising melting vessels and heated feeding lines for accurate and controlled feeding of the end-capper to the polycarbonate.

EP 0 980 861A1 discloses the use of certain salicylic acid ester derivatives as terminal blocking agents in amounts of 0.1 to 10 times, and most preferably 0.5 to 2 times, mole per mole equivalent of terminal hydroxyl groups of the polycarbonate formed at a time of the addition. Such polycarbonates have good color tone suitable for optical material use. It is disclosed that these end-cappers are activated by a phenolic group having an ortho methoxycarbonyl or ethoxycarbonyl group. It should be noted that the Examples of EP 0 980 861A1 teach the use of 2-methoxycarbonylphenyl-phenylcarbonate as an end-capper in an amount that is about 1 mole per mole equivalent of terminal hydroxyl groups to form a polycarbonate with increased end-cap levels.

There is still a need for an improved melt process using easy to handle low melting end-cappers to produce polycarbonate having capped terminals and controlled molecular weight.

SUMMARY OF THE INVENTION

The invention relates to a process for the production of polycarbonate, the process comprising adding a terminal blocking agent of the formula:

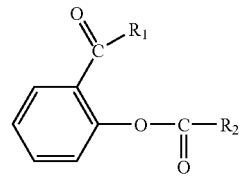

wherein $R_1$ is a propoxy or butoxy and $R_2$ is selected from the group consisting of $C_1$-$C_{30}$ alkyl, $C_1$-$C_{30}$ alkoxy, $C_6$-$C_{30}$ aryl, $C_7$-$C_{30}$ aralkyl, and $C_6$-$C_{30}$ aryloxy.

In one embodiment, $R_2$ is substituted with a member selected from the group consisting of a propoxycarbonyl, butoxycarbonyl, 2-(propoxycarbonyl)phenyloxycarbonyl, 2-(butoxycarbonyl)phenyloxycarbonyl, 2-(propoxycarbonyl)phenyloxycarbonyloxy, and 2-(butoxycarbonyl)phenyloxycarbonyloxy group.

In another embodiment, R1 is n-propoxy and R2 is selected from the group consisting of stearyl, phenyl, para-t-butyl-phenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof.

DETAILED DESCRIPTION OF THE INVENTION

Applicants have surprisingly found in the process of the present invention that, by adding a relatively small amount of the low melting end-cappers or terminal blocking agents of the invention, the end-capper rapidly caps or blocks the terminal OH groups of the melt polycarbonate.

End-capping agent/MW Builder: In the process of the present invention, the compound of the following formula is added to a polycarbonate oligomer as an end-capper or terminal blocking agent and to control the molecular weight of the polycarbonate oligomer:

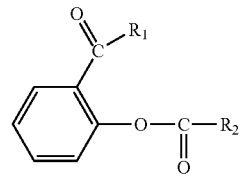

wherein $R_1$ is a propoxy or butoxy and $R_2$ is selected from the group consisting of $C_1$-$C_{30}$ alkyl, $C_1$-$C_{30}$ alkoxy, $C_6$-$C_{30}$ aryl, $C_7$-$C_{30}$ aralkyl, and $C_6$-$C_{30}$ aryloxy.

In one embodiment, $R_2$ is substituted with a member selected from the group consisting of a propoxycarbonyl, butoxycarbonyl, 2-(propoxycarbonyl)phenyloxycarbonyl, 2-(butoxycarbonyl)phenyloxycarbonyl, 2-(propoxycarbonyl)phenyloxycarbonyloxy, and 2-(butoxycarbonyl)phenyloxycarbonyloxy group.

In a second embodiment, $R_1$ is n-propoxy or butoxy. In yet a third embodiment, $R_1$ is no-propoxy and $R_2$ is selected from the group consisting of stearyl, phenyl, para-t-butylphenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof.

In another embodiment, endcappers based on derivatives of n-propyl salicylate or butyl salicylate that have low melting points such as n-propylsalicyl phenyl carbonate or butylsalicyl phenyl carbonate are used.

It is preferred that at least 80%, and more preferably at least 90% of the total endcapping agent added to the reaction mixture be added when the number average molecular weight of the oligomer is between 2,500 and 15,000 Dalton.

Preparation of the end-capper In one embodiment of the invention, the end-capper is prepared by the reaction of appropriate chloroformates (e.g., phenyl chloroformate or p-cumylphenyl chloroformate) with one equivalent of an activated phenol, such as propyl salicylate, in a solvent such as methylene chloride and in the presence of a base to neutralize the liberated HCl. Additional catalysts may be employed in this reaction to facilitate the condensation reaction. After completion of the condensation reaction, the product solution is washed with aqueous acid and base then with water until the washings are neutral. The organic solvent may be removed by distillation and the end-capper is crystallized or distilled and recovered.

The condensation reaction to prepare the end-capper of the present invention may be carried out under anhydrous conditions known in the art using one or more equivalents of a tertiary amine per equivalent of chloroformate as the base, or under interfacial conditions also well-known in the art using aqueous sodium hydroxide as the base in the presence of a condensation catalyst. In one embodiment, the condensation catalyst is triethyl amine, quaternary alkyl ammonium salt, or mixtures thereof.

Terminal Blocking Reaction in the Polycarbonate Production Process: The terminal blocking agent of the present invention is used to rapidly cap or block the terminal hydroxy group ($\sim$OH) of the polycarbonate to block the terminal of the polycarbonate as shown below:

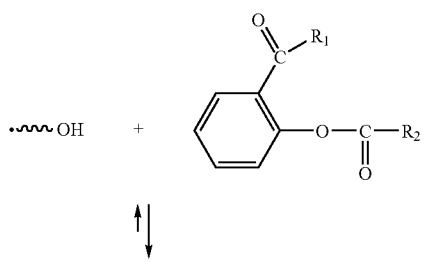

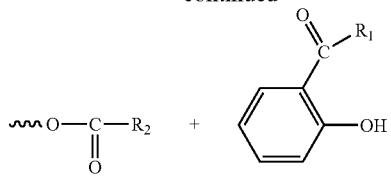

The ortho-substituted phenols generated in the reaction of the formula shown below are less reactive than phenol in backbiting reactions, which lead to molecular weight degradation of the polycarbonate. Therefore, the by-product phenols are removed from the terminal-blocked polycarbonate by distillation to the over-head system using conventional means (i.e., freeze traps using chilled water as a coolant) where they can be condensed to expedite the terminal blocking at high yields.

It should be noted that the terminal-blocked polycarbonate may still contain small amounts of any unrecovered phenols, any unreacted terminal blocking agent along with by-products of any side reactions to the terminal blocking reactions, e.g. terminal 2-(alkoxycarbonyl)phenyl groups and the like. In one embodiment, the terminal-blocked polycarbonate contains about less than 500 ppm of ortho-substituted phenols and about 500 ppm of unreacted terminal blocking agent of the present invention. In another embodiment, the terminal-blocked polycarbonate contains about 2,500 ppm or less of terminal 2-(alkoxycarbonyl)phenyl groups.

In one embodiment, the ortho-substituted phenol by-product of the following formula is recovered from the overhead system and reused to prepare new end-cappers or terminating agents.

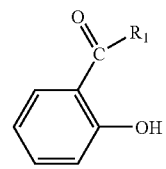

Melt Polycarbonate Process The process of the present invention is a melt or transesterification process. The production of polycarbonates by transesterification is well-known in the art and described, for example, in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905.

In the melt process, polycarbonate is produced by the melt polycondensation of aromatic dihydroxy compounds (A) and carbonic acid diesters (B). The reaction can be carried out by either a batch mode or a continuous mode. The apparatus in which the reaction is carried out can be any suitable type of tank, tube, or column. The continuous processes usually involve the use of one or more CSTR's and one or more finishing reactors.

Examples of the aromatic dihydroxy compounds (A) include bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl)phenylmethane; 2,2-bis(4- hydroxy-1-methylphenyl)propane; 1,1-bis(4-hydroxy-t-butylphenyl)propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is bisphenol A (BPA).

Examples of the carbonic acid diesters (B) include diphenyl carbonate; ditolyl carbonate; bis(chlorophenyl)carbonate; m-cresyl carbonate; dinaphthyl carbonate; bis(diphenyl) carbonate; diethyl carbonate; dimethyl carbonate; dibutyl carbonate; and dicyclohexyl carbonate. In one embodiment of an industrial process, diphenyl carbonate (DPC) is used.

In one embodiment of the invention, the terminal blocking agent of the present invention is added together with DPC or another diaryl carbonate.

The carbonic diester component may also contain a minor amount, e.g., up to about 50 mole % of a dicarboxylic acid or its ester, such as terephthalic acid or diphenyl isophthalate, to prepare polyesterpolycarbonates.

In preparing the polycarbonates, usually about 1.0 mole to about 1.30 moles of carbonic diester are utilized for every 1 mole of the aromatic dihydroxy compound. In one embodiment, about 1.01 moles to about 1.20 moles of the carbonic diester is utilized.

Optional Terminators/End-capping Agents. In one embodiment of the melt process, additional/optional terminators or end-capping agents of the prior art may also be used. Examples of terminators include phenol, p-tert-butylphenol, p-cumylphenol, octylphenol, nonylphenol and other endcapping agents well-known in the art.

Optional Branching Agents. In one embodiment of the process of the present invention, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethylbenzyl)phenol, trimesic acid and benzophenone tetracarboxylic acid.

Optional Coupling Agent. In one embodiment of the process of the present invention, a coupling agent such as a bis-alkylsalicyl carbonate, e.g., bis-methyl or ethyl or propyl salicyl carbonate, bis-phenyl or benzyl salicyl carbonate, bis(2-benzoylphenyl) carbonate, BPA-bis-2-alkoxyphenylcarbonate, BPA-bis-2-aryloxyphenylcarbonate, or BPA-bis-2-benzoylphenylcarbonate is used in conjunction with the end-capper in order to obtain a faster and/or greater build in molecular weight in the polycarbonate oligomer.

Optional catalysts. The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, and dimethyl diphenyl ammonium hydroxide.

The above-mentioned catalysts may each be used by themselves, or, depending on the intended use, two or more types may be used in combination. When more than one catalyst is employed, each may be incorporated into the melt at a different stage of the reaction.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In one embodiment, the level is in the range of about $1 \times 10^{-5}$ to about $5 \times 10^{-2}$ mole per mole of dihydroxy compound. When more than one catalyst is employed, each may be incorporated into the melt at a different stage of the reaction.

Other optional components in the polycarbonate In the present invention, the polycarbonate obtained may further contain at least one of a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

Adding the terminal blocking agent to the melt process The method of adding the end-capper of the present invention to polycarbonate is not specially limited. For example, the end-capper may be added to the polycarbonate as a reaction product in a batch reactor or a continuous reactor system. In one embodiment, the end-capper is added to the melt polycarbonate just before or after a later reactor, i.e., a polymerizer, in a continuous reactor system. In a second embodiment, the end-capper is by reactive extrusion after the last polymerizer in the continuous reactor system. In a third embodiment, it is added between the $1^{st}$ and $2^{nd}$ polymerizer in a continuous reactor system. In yet another embodiment, the end-capper is added between the $2^{nd}$ reactor and the $1^{st}$ polymerizer.

The end-capper or terminal blocking agent is added at a stoichiometry of about between 0.3 and 2.0 relative to the free OH content of the polycarbonate oligomer to which it is added. In one embodiment, it is added at a stoichiometry of about 0.5 to 1.5. In another embodiment, it is added at a stoichiometry of about of 0.8 to 1.3 relative to the free OH that would be obtained in the final targeted molecular weight of the polycarbonate and no other end-capper is used.

The apparatus/method for feeding the end-capper is not specially limited. The end-capper may be added in the form of a solid, a liquid, a melt or a solution thereof. Further, the end-capper may be added in a predetermined amount once, or it may be separated into predetermined amounts and added several times. In one embodiment, it is added to the process as a powder by means of a static mixer.

In embodiments wherein low melting point end-cappers are used, it is not necessary to require melting drums and heated addition lines for the end-capper addition system since the risk of blockages in the addition system or lines due to solidification of the end-capper in cold spots is minimal.

EXAMPLES

The present invention will be explained hereinafter with reference to Examples, while the present invention shall not be limited by Examples.

End-cappers. The end-cappers used in the examples were prepared as follows:

Propyl salicyl phenyl carbonate To a solution of 29.7 g (0.165 mol) propyl salicylate and triethylamine, 16.66 g (0.165 mol) in 200 ml of toluene was added dropwise over 30 minutes, a solution of phenyl chloroformate, 25.24 g (0.164 mol) in 50 ml of toluene. When addition was complete, the reaction mixture was stirred for one hour at room temperature and filtered. The filtrate was washed successively with 200 ml of 2% aqueous NaOH, 2×200 ml of 10% HCl and 200 ml of saturated sodium chloride. After passage through a cone of anhydrous $CaSO_4$, the solvent was removed on a rotary evaporator to afford a an oil which was distilled to afford 39 g (79.3%) of a colorless oil (boiling point or "bp" of 155-165° C. @ 3.5 mm Hg). $^1$H NMR ($CDCl_3$) δ 8.2-7.3 (m,9,ArH), 4.40 (t,2,OC$\underline{H}_2$CH$_2$CH$_3$), 2.00 (m,2,OCH$_2$C$\underline{H}_2$CH$_3$) and 1.15 ppm (t,3,OCH$_2$CH$_2$C$\underline{H}_3$).

i-Propyl salicyl phenyl carbonate In a manner similar to that described in the above procedure, phenyl chloroformate, 21.6 g (0.138 mol) in toluene was added dropwise to a solution of i-propyl salicylate, 25.0 g (0.139 mol) and 14.0 g (0.139 mol) of triethylamine in 200 ml of toluene. The usual work-up afforded an oil which was distilled to afford 34.4 g (83.1%) of a colorless oil (bp=155-165° C. @ 0.3 mm Hg). $^1$H NMR ($CDCl_3$) δ 8.2-7.3 (m,9, ArH) 5.4 (m,1,OC$\underline{H}$(CH$_3$)$_2$) and 1.4 ppm (d,6,OCH(C$\underline{H}_3$)$_2$).

Butyl salicyl phenyl carbonate In a manner similar to that described in the above procedures, phenyl chloroformate, 20.66 g (0.132 mol) in toluene was added dropwise to a solution of butyl salicylate, 25.88 g (0.133 mol) and 13.4 g (0.133 mol) of triethylamine in 200 ml of toluene. The usual work-up afforded an oil which was distilled to afford 32.5 g (78.5%) of a colorless oil (bp=190-200° C. @ 0.2 mm Hg). $^1$H NMR ($CDCl_3$) δ 8.2-7.3 (m,9, ArH) 4.4 (t, 2,OC$\underline{H}_2$(CH$_2$)$_2$CH$_3$), 1.75 (m,2, OCH$_2$C$\underline{H}_2$CH$_2$CH$_3$), 1.50 (m,2, OCH$_2$CH$_2$C$\underline{H}_2$CH$_3$)and 0.95 ppm (t,3, OCH$_2$CH$_2$CH$_2$C$\underline{H}_3$).

Propyl salicyl p-cumylphenyl carbonate A solution of propyl salicylate, 25.0 g (0.139 mol) and p-cumylphenyl chloroformate, 38.0 g (0.138 mol) in 200 ml of $CH_2Cl_2$ was treated dropwise over 10 minutes with a solution of sodium hydroxide, 6.0 g (0.15 mol) and methyltributylammonium hydroxide (0.5 ml of a 70% aqueous solution) in 100 ml of water. The two phase mixture was stirred an additional 10 minutes and the organic layer was separated and washed with 2×200 ml of 10% HCl and 1×200 ml of saturated sodium chloride. After passage of the solution through a cone of anhydrous $CaSO_4$, solvent and excess propyl salicylate were removed under vacuum to afford 56.7 g (98.3%) of a light amber oil consisting of the desired product. $^1$H NMR ($CDCl_3$) δ 8.15-7.3 (m,13,ArH), 4.35 (t,2,OC$\underline{H}_2$CH$_2$CH$_3$), 1.8 (m,2,OCH$_2$C$\underline{H}_2$CH$_3$), 1.75 (s,6,ArC(C$\underline{H}_3$)$_2$) and 1.05 (t,3,OCH$_2$CH$_2$C$\underline{H}_3$).

Starting Material Polycarbonate In all examples, either starting polycarbonate grade A or B was used. The starting materials were prepared by a melt process in a continuous reactor system with the following properties:

|  | Polycarbonate A | Polycarbonate B |
| --- | --- | --- |
| Weight-average molecular weight Mw: | 18.3 * 10$^3$ g/mole | 28.8 * 10$^3$ g/mole |
| Number-average molecular weight Mn: | 8.34 * 10$^3$ g/mole | 11.7 * 10$^3$ g/mole |
| Free OH content: | 670 ppm | 967 ppm |
| End-cap ratio | 83.6% | 66.7% |

In the Examples, the following measurements were made.

a) Molecular weight: Mw and Mn were measured by GPC analysis of 1 mg/ml polymer solutions in methylene chloride versus polystyrene standards. The measured polycarbonate Mw and Mn values were then corrected for the difference in retention volume between polycarbonate and polystyrene standards.

b) Free-OH content was measured by UV/Visible analysis of the complexes formed from the polymer with $TiCl_4$ in methylene chloride solution. In some cases the Free OH content was measured by a direct UV method.

c) End-cap levels were calculated from the free OH content and Mn values.

Examples 1-2

A batch reactor tube was charged under nitrogen with 25 g of polycarbonate A and 1.084×10$^{-3}$ mole of either end-capper n-Propyl Salicyl Phenyl Carbonate (0.3254 g of "n-PSPC"—Example 1) or end-capper Butyl Salicyl Phenyl Carbonate (0.3407 g of "BSPC"—Example 2) of formulae (1) and (2). The mixture was heated to a temperature of 300° C. and stirred for 20 minutes. After the melt mixing, stage vacuum was applied to the system to a pressure of 0.5 mbar and the reaction continued for 20 minutes. After the reaction stage, the polymer was sampled from the reaction tube. The results are shown in table 1.

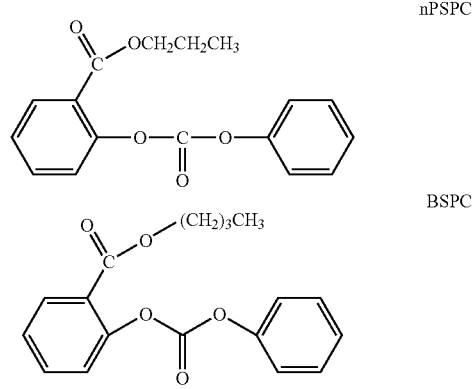

Comparative Examples 1-5

Example 1 was repeated but either no end capper was used, or various other end-cappers of the following formulae were used instead. The results are also shown in table 1.

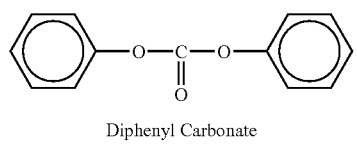

Diphenyl Carbonate

Example 3

The same conditions as in examples 1-2 except that Polycarbonate B was used instead of A and that 0.4696 g ($1.564 \times 10^{-3}$ mole) of n-Propyl Salicyl Phenyl Carbonate (n-PSPC) was used as an end-capper instead. The results are also shown in table 1.

Comparative Examples 6-7

Example 3 was repeated except that no end-capper was used for comparative example 6, and 0.3350 g ($1.564 \times 10^{-3}$ mole) of Diphenyl Carbonate was used as an end-capper for comparative example 7. The results are in table 1.

TABLE 1

| Example | Starting Material | End-capper/Blocking Agent Used | Amount mole/—OH | Reaction time min. | Mw g/mole | Mn g/mole | End-cap % |
|---|---|---|---|---|---|---|---|
| Starting Material | A | — | — | — | 18.3 E+03 | 8.34 E+03 | 83.6 |
| Starting Material | B | — | — | — | 28.8 E+03 | 11.7 E+03 | 66.7 |
| 1 | A | n-Propyl Salicyl Phenyl Carbonate | 1.1 | 20 | 19841 | 8901 | 91.3 |
| 2 | A | Butyl Salicyl Phenyl Carbonate | 1.1 | 20 | 18167 | 8074 | 90.7 |
| Comp. 1 | A | — | — | 20 | 20992 | 11740 | 85.1 |
| Comp. 2 | A | Diphenyl Carbonate | 1.1 | 20 | 21058 | 11692 | 88.1 |
| Comp. 3 | A | Methyl Salicyl Phenyl Carbonate | 1.1 | 20 | 19631 | 10623 | 90.2 |
| Comp. 4 | A | Ethyl Salicyl Phenyl Carbonate | 1.1 | 20 | 18877 | 8298 | 89.7 |
| Comp. 5 | A | Iso-Propyl Salicyl Phenyl Carbonate | 1.1 | 20 | 19480 | 8669 | 87.0 |
| 3 | B | n-Propyl Salicyl Phenyl Carbonate | 1.1 | 20 | 28605 | 11840 | 75.9 |
| Comp. 6 | B | — | — | 20 | 30470 | 12272 | 61.6 |
| Comp. 7 | B | Diphenyl Carbonate | 1.1 | 20 | 25634 | 11102 | 64.8 |

-continued

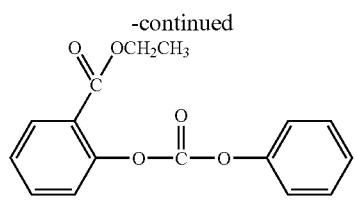

Ethyl Salicyl Phenyl Carbonate

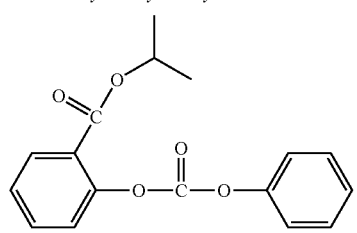

Iso-Propyl Salicyl Phenyl Carbonate

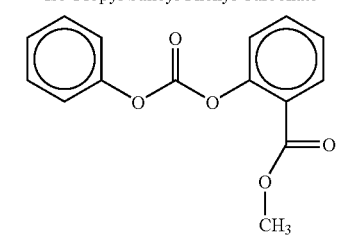

Methyl Salicyl Phenyl Carbonate

What is claimed is:

1. A process for the production of an aromatic polycarbonate, the process comprising adding to a polycarbonate oligomer reaction mixture comprising polycarbonate with free hydroxy groups under melt conditions an amount of a terminal blocking agent of the following formula:

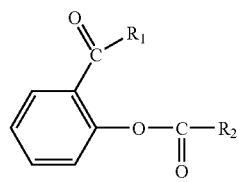

to form a polycarbonate having an increased level of capped or blocked hydroxy groups, wherein at least 80% of the blocking agent is added after the oligomer has reached a number-average molecular weight Mn of about 2,500 to 15,000 Dalton, and wherein $R_1$ is a propoxy or butoxy and $R_2$ is selected from the group consisting of $C_1$-$C_{30}$ alkyl, $C_1$-$C_{30}$ alkoxy, $C_6$-$C_{30}$ aryl, $C_7$-$C_{30}$ aralkyl, and $C_6$-$C_{30}$ aryloxy.

2. The process of claim 1, wherein $R_2$ is substituted with a member selected from the group consisting of propoxycarbonyl, butoxycarbonyl, 2-(propoxycarbonyl)phenyloxycarbonyl, 2-(butoxycarbonyl)phenyloxycarbonyl, 2-(propoxycarbonyl)phenyloxycarbonyloxy, and 2-(butoxycarbonyl)phenyloxycarbonyloxy groups or mixtures thereof.

3. The process of claim 1, wherein $R_1$ is n-propoxy or butoxy.

4. The process of claim 1, wherein $R_2$ is selected from the group consisting of stearyl, phenyl, para-t-butyl-phenyl, phenoxy, para-tert-butyiphenoxy, para-octyiphenoxy, para-nonyiphenoxy, para-dodecyiphenoxy, 3-pentadecyiphenoxy, para-octadecyiphenoxy, para-cumyiphenoxy, and mixtures thereof.

5. The process according to claim 1, wherein the terminal blocking agent is added in an amount of about 0.1 to 1.5 mole based on 1 mole equivalent of the free terminal —OH groups of the polycarbonate at the time of the addition.

6. The process according to claim 5, wherein the terminal blocking agent is added in an amount of about 0.8 to 1.3 mole equivalent per mole of the free terminal —OH groups of the polycarbonate at the time of the addition.

7. The process according to claim 1, further comprising adding to the polycarbonate under melt conditions a coupling agent select from the group consisting of: bis-alkyl-salicyl carbonate, bis(2-benzoylphenyl) carbonate, BPA-bis-2-alkoxyphenylcarbonate, BPA-bis-2-aryloxyphenylcarbonate, BPA-bis-2-benzoylphenylcarbonate and mixtures thereof.

8. The process according to claim 1, wherein the formed polycarbonate has a content of ortho-substituted phenols generated in the terminal blocking reaction of 500 ppm or below.

9. The process according to claim 1, wherein the formed polycarbonate has a content of ortho-substituted phenols generated in the terminal blocking reaction of 100 ppm or below.

10. The process according to claim 1, wherein the formed polycarbonate has a content of terminal blocking agent of 500 ppm or below.

11. The process according to claim 1, wherein the formed polycarbonate has a content of terminal blocking agent of 100 ppm or below.

12. The process according to claim 1, wherein the formed polycarbonate has a content of terminal 2-(alkoxycarbonyl) phenyl groups of 2,500 ppm or below.

13. The process according to claim 1, wherein the formed polycarbonate has a content of terminal 2-(propoxycarbonyl)phenyl groups of 1,000 ppm or below.

* * * * *

UNITED STATES PATENT AND TRADEMARK OFFICE
CERTIFICATE OF CORRECTION

PATENT NO.        : 7,259,223 B2
APPLICATION NO.   : 10/802705
DATED             : August 21, 2007
INVENTOR(S)       : Brack et al.

It is certified that error appears in the above-identified patent and that said Letters Patent is hereby corrected as shown below:

Column 11, Claim 4, Lines 5 through 8 should read: -- phenoxy, para-tert-butylphenoxy, para-octylphenoxy, para-nonylphenoxy, para-dodecylphenoxy, 3-pentadecylphenoxy, para-octadecylphenoxy, para-cumylphenoxy, and mixtures thereof. --

Signed and Sealed this

Twenty-third Day of October, 2007

JON W. DUDAS
*Director of the United States Patent and Trademark Office*